US010558887B2

(12) United States Patent
Sodhani et al.

(10) Patent No.: US 10,558,887 B2
(45) Date of Patent: Feb. 11, 2020

(54) DIGITAL IMAGE SEARCH BASED ON ARBITRARY IMAGE FEATURES (71) Applicant: Adobe Inc., San Jose, CA (US)

(72) Inventors: Shagun Sodhani, Delhi (IN); Nikaash Puri, New Delhi (IN)

(73) Assignee: Adobe Inc., San Jose, CA (US)

(*) Notice: Subject to any disclaimer, the term of this patent is extended or adjusted under 35 U.S.C. 154(b) by 186 days.

(21) Appl. No.: 15/831,160

(22) Filed: Dec. 4, 2017

(65) Prior Publication Data
US 2019/0171906 A1 Jun. 6, 2019

(51) Int. Cl.
G06K 9/62 (2006.01)
G06F 16/583 (2019.01)

(52) U.S. Cl.
CPC ......... G06K 9/6215 (2013.01); G06F 16/583 (2019.01); G06F 16/5838 (2019.01); G06K 9/623 (2013.01)

(58) Field of Classification Search
CPC .... G06K 9/6215; G06K 9/623; G06F 16/583; G06F 16/5838
See application file for complete search history.

(56) References Cited

U.S. PATENT DOCUMENTS

| 5,579,471 A * | 11/1996 | Barber | G06K 9/4647 715/700 |
| 5,986,670 A * | 11/1999 | Dries | G06F 17/5004 345/629 |
| 6,751,343 B1 * | 6/2004 | Ferrell | G06F 16/5838 382/145 |
| 6,859,802 B1 * | 2/2005 | Rui | G06K 9/6215 |
| 7,139,767 B1 * | 11/2006 | Taylor | G06F 16/50 |
| 7,139,970 B2 * | 11/2006 | Michaud | G06F 16/9577 715/247 |
| 8,126,907 B2 * | 2/2012 | Knighton | G06Q 30/0251 707/769 |
| 8,358,691 B1 * | 1/2013 | Wang | G06T 7/20 375/240.02 |
| 2006/0036577 A1 * | 2/2006 | Knighton | G06Q 30/0251 |
| 2013/0266292 A1 * | 10/2013 | Sandrew | H04N 9/79 386/282 |
| 2015/0120760 A1 * | 4/2015 | Wang | G06F 16/58 707/749 |

* cited by examiner

Primary Examiner — Samir A Ahmed
(74) Attorney, Agent, or Firm — SBMC (57) ABSTRACT In implementations of digital image search based on arbitrary image features, a server computing device maintains an images database of digital images, and includes an image search system that receives a search input as a digital image depicting image features, and receives search criteria of depicted image features in the digital image. The image search system can then determine similar images to the received digital image based on similarity criterion corresponding to the search criteria. A trained image model of the image search system is applied to determine an image feature representation of the received digital image. A feature mask model of the image search system is applied to the image feature representation to determine a masked feature representation of the received digital image. The masked feature representation of the received digital image is compared to a masked feature representation of each respective database image to identify the similar images.

20 Claims, 7 Drawing Sheets

FIG. 7

DIGITAL IMAGE SEARCH BASED ON ARBITRARY IMAGE FEATURES

BACKGROUND

Many people utilize image services that provide on-line access to millions of high-quality digital images, graphics, videos, and other image assets that are widely used across various creative industries. For example, designers, illustrators, architects, and editors, as well as novice and other enthusiasts, will likely interact with an on-line image service at some point in creative processes to search for and use an image or images that have some particular correlation to a creative project. However, with conventional image services, a user is not able to upload an image that he or she already has and specify in particular what it is about the uploaded image the user is searching to find in other similar images. Typically, the search results returned by a conventional image service are based on some general features of the uploaded image, but do not focus on any specific notion of similarity.

For example, a user may upload an image of a snow-capped mountain at sunset with a river running through the image. A conventional image service does not provide that the user can specify what is meant by "similarity," particularly in reference to the uploaded image. For instance, is the user searching for similar images that have snowcapped mountains with a similar looking background? Alternatively, is the user searching for images of sunsets having a similar color gradient, or rather, is the user searching for similar images of mountains and/or rivers, and the sunset is simply incidental? The conventional image services may determine overall image similarity and return images that, in some respect, appear visually similar to an uploaded image. However, this type of visual similarity determination is based on an inherent assumption that there is only one unique notion of similarity for a particular uploaded image, and does not allow a user to designate the aspects of similarity which may be of interest to the user.

Additionally, some conventional image services may provide that a user can filter some general visual aspects when searching for similar images to an uploaded image. For example, a user may be able to designate or toggle whether a search for similar images will include or exclude people in the images, or the user may be able to filter for a particular color gradient. However, as noted above, simply being able to filter on one or two designated aspects for image searching does not provide a user the ability to designate what it is about a particular uploaded image the user is searching to find in other similar images, and does not allow the user to specify what the user considers as similar.

SUMMARY

This Summary introduces features and concepts of digital image search based on arbitrary image features, which is further described below in the Detailed Description and shown in the Figures. This Summary should not be considered to describe essential features of the claimed subject matter, nor used to determine or limit the scope of the claimed subject matter.

Aspects of digital image search based on arbitrary image features are described. In implementations, a server computing device, such as implemented at a cloud-based service system, maintains an images database of digital images. The server computing device implements an image search system that can receive a search input as a digital image depicting image features. For example, a user of a client computing device may upload a digital photo or other type of image to the cloud-based service system as a search input, which initiates the image search system to search the images database for other similar images to the uploaded digital image. The image search system can also receive search criteria as part of the search input from the user, and the search criteria correlates with one or more depicted image features in the uploaded digital image. For example, the user of the client computing device can also input search criteria that is then used by the image search system to determine the similar images based on similarity criterion that corresponds to the search criteria. The image search system can associate the input search criteria with similarity criterion masks that correspond to image features of the digital images in the images database. The similarity criterion masks may be representative of any type of depicted image feature, to include an item, object, person, color, background, theme, texture, lighting, and/or any other type of depicted image feature or characteristic shown in a received digital image that is uploaded as a search input.

The image search system can then determine the similar images from the images database to the received digital image based on the similarity criterion that corresponds to the search criteria. Each similarity criterion is represented by a similarity criterion mask in the image search system, and a combination of similarity criterion masks can be used to represent the similarity criterion corresponding to two or more of the search criteria for the depicted image features in the received digital image. Multiple similarity criterion masks that each correspond to a different similarity criterion can be composed together for determining the similar images in the images database based on a combination of the similarity criterion. To determine the similar images from the images database, a trained image model of the image search system is applied to determine an image feature representation of the received digital image that is uploaded as the search input by the user. The image feature representation can be determined as an image feature vector, which is a vector representation of the depicted image features in the received digital image. A feature mask model of the image search system is then applied to the image feature representation to determine a masked feature representation for the received digital image. The masked feature representation can be determined as a masked feature vector, which is generated from the image feature vector and is a vector representation of the similarity criterion of the depicted image features in the digital image.

The image search system can then compare the masked feature representation of the received digital image to a masked feature representation of each respective database digital image to identify the similar images to the received digital image based on the similarity criterion. In implementations, the image search system can determine a Euclidian distance between the received digital image and each of the database digital images. The Euclidian distances are determined based on a comparison of the masked feature vector for the received digital image to a masked feature vector of each respective database digital image. The Euclidian distances identify the similar images from the database digital images to the received digital image. For example, the database digital images that are determined to have the closest Euclidian distance to the received digital image are the similar images having the similar image features, as requested by the user with the input search criteria of the depicted image features in the uploaded digital image.

The cloud-based service system can then return the determined similar images as search results to the client computing device for the user. The determined similar images are returned as the database digital images having the closest Euclidian distances between the masked feature vector for the received digital image and the masked feature vector of each respective database digital image. The image search system can also identify or indicate an image feature, or features, depicted in a returned similar image as user feedback of the image features that contribute to determining a similar image is similar to the received digital image. For example, a returned similar image may include a highlighted or otherwise identified section of the similar image that contributed to the determination by the image search system of the image being similar to the received digital image from the user.

BRIEF DESCRIPTION OF THE DRAWINGS

Implementations of digital image search based on arbitrary image features are described with reference to the following Figures. The same numbers may be used throughout to reference similar features and components that are shown in the Figures.

DETAILED DESCRIPTION

Implementations of digital image search based on arbitrary image features are described, and provide that a user can upload a digital image that is of interest to the user to a cloud-based image service, along with search criteria of selected arbitrary image features depicted in the uploaded digital image. The user can designate what it is about the uploaded digital image the user is searching to find in other similar images, allowing the user to specify what the user considers as "similar" in context of the uploaded digital image and the designated image features. The user can designate or otherwise indicate which aspects of the uploaded digital image the user feels are important in the context of similarity when searching for the other similar images.

In aspects of the described image search based on arbitrary image features, a cloud-based service system is implemented as an image service that can be accessed on-line, and includes an images database of digital images, which may be millions of high-quality digital images, graphics, videos, and other image assets. In other implementations, the cloud-based service system may be an overall asset service that can be accessed on-line, and includes one or more databases of the digital images, graphics, videos, templates, and/or any other type of asset, such as may be made available on a subscription basis for user access. Although generally described as an image search for similar images based on user designated image features, the features and aspects of digital image search based on arbitrary image features as described herein may be implemented for any of the other asset types.

The image service, described herein as the on-line accessible cloud-based service system, implements an image service system that a user can interface with via a client computing device. For example, the user of the client computing device can not only upload the digital image as a basis to determine or find other similar images stored in the images database, but the user can also define the context of image similarity for the image search, based on the search criteria input as any selected arbitrary image features of the uploaded digital image. This allows the user an opportunity to define complex image similarity search requests for the other similar images having specific and detailed image features. For example, the user may want to search for similar images having both a similar background and color scheme to the image of interest that the user has uploaded to initiate the image search. The image search system is implemented for composition of individual similarity criterion corresponding to the search criteria for the background and the color scheme to generate results that take into account both aspects of the searched image features.

The image search system can associate the search criteria input from the user with similarity criterion that corresponds to image features of the digital images in the images database. The similarity criterion is learned by the image search system based on the digital images in the images database, and may be representative of any type of depicted image feature, to include an item, object, person, color, background, theme, texture, lighting, and/or any other type of depicted image feature or characteristic shown in a digital image. The similarity criterion can be learned using any type of machine-learning implemented by the image search system. As described herein, machine-learning can be implemented as a computing model that utilizes algorithms to learn from, and make predictions on, known data by analyzing the known data to learn to generate outputs that reflect patterns and attributes of the known data. In aspects of the described image search based on arbitrary image features, a machine-learning model can be used to learn the many different image features by analyzing the digital images in the images database.

In implementations, a trained image model of the image search system is applied to determine an image feature representation of the received digital image that is uploaded as the search input by the user. The image feature representation can be determined as an image feature vector, which is a vector representation of the depicted image features in the received digital image. The trained image model of the image search system may be a convolutional neural network or other type of machine-learning model that is pre-trained for image classification, and can be used to learn the many image features of the digital images in the images database. Generally, a convolutional neural network is a type of machine-learning model implemented as a computing algorithm for self-learning with multiple layers that run logistic regression on data to learn features and train parameters of the network. The self-learning aspect is also referred to as unsupervised feature learning because the input is unknown to the convolutional neural network, in that the network is not explicitly trained to recognize or classify the image features, but rather trains and learns the image features from the input of the digital images in the images database.

A feature mask model of the image search system is then applied to the image feature representation that is generated by the trained image model to determine a masked feature representation for the received digital image, as uploaded by the user to the image search system. The masked feature representation can be determined as a masked feature vector, which is generated from the image feature vector and is a vector representation of the similarity criterion of the depicted image features in the digital image. The feature mask model is implemented as a gradient descent type of model to determine the similarity criterion from the digital images in the images database, and determine the masked feature vector for the received digital image.

Generally, a gradient descent model can be implemented as an optimization algorithm designed to find the minimum of a function, and as used herein, optimizes for a loss function algorithm of the image search system. Initially, the image search system learns a basis for comparison of the digital images in the images database based on designated, known similarity criterion. For example, the feature mask model of the image search system considers each possible combination pair of the digital images by two images at a time, and learns to distinguish whether the two respective images are similar or not similar based on the designated, known similarity criterion. A loss function algorithm of the image search system is then applied to maximize the Euclidean distance between the digital images that are not similar as designated by the similarity criterion, while minimizing the distance between the digital images that are similar as designated by the similarity criterion.

As noted above with reference to the received digital image that is uploaded as the search input by the user, the trained image model of the image search system is applied to determine the image feature vector of the received digital image, and the feature mask model of the image search system is then applied to the image feature vector to determine the masked feature vector for the received digital image. A Euclidian distance algorithm of the image search system can then determine a Euclidian distance between the received digital image and each of the database digital images. The Euclidian distances are determined based on a comparison of the masked feature vector for the received digital image to a masked feature vector of each respective database digital image. The Euclidian distances identify the similar images from the database digital images to the received digital image. For example, the database digital images that are determined to have the closest Euclidian distance to the received digital image are the similar images having the similar image features, as requested by the user with the input search criteria of the depicted image features in the uploaded digital image.

The cloud-based service system can then return the determined similar images as search results to the client computing device for the user. The image search system can also identify or indicate an image feature, or features, depicted in a returned similar image as user feedback of the image features that contribute to determining a similar image is similar to the received digital image. For example, a returned similar image may include a highlighted or otherwise identified section of the similar image that contributed to the determination by the image search system of the image being similar to the received digital image from the user. This interpretability of the identified image features that contributed to the determination of image similarity provides a user experience confidence in the image search system, and provides an indication of system justification for the similarity determination. The interpretability also provides that the user can re-initiate the search for the other similar images based on the uploaded digital image with different or altered search criteria if the initial search results are not specifically what the user was seeking as "similar" in the context of the uploaded digital image and the designated image features.

While features and concepts of digital image search based on arbitrary image features can be implemented in any number of different devices, systems, networks, environments, and/or configurations, implementations of digital image search based on arbitrary image features are described in the context of the following example devices, systems, and methods.

Figure 1:
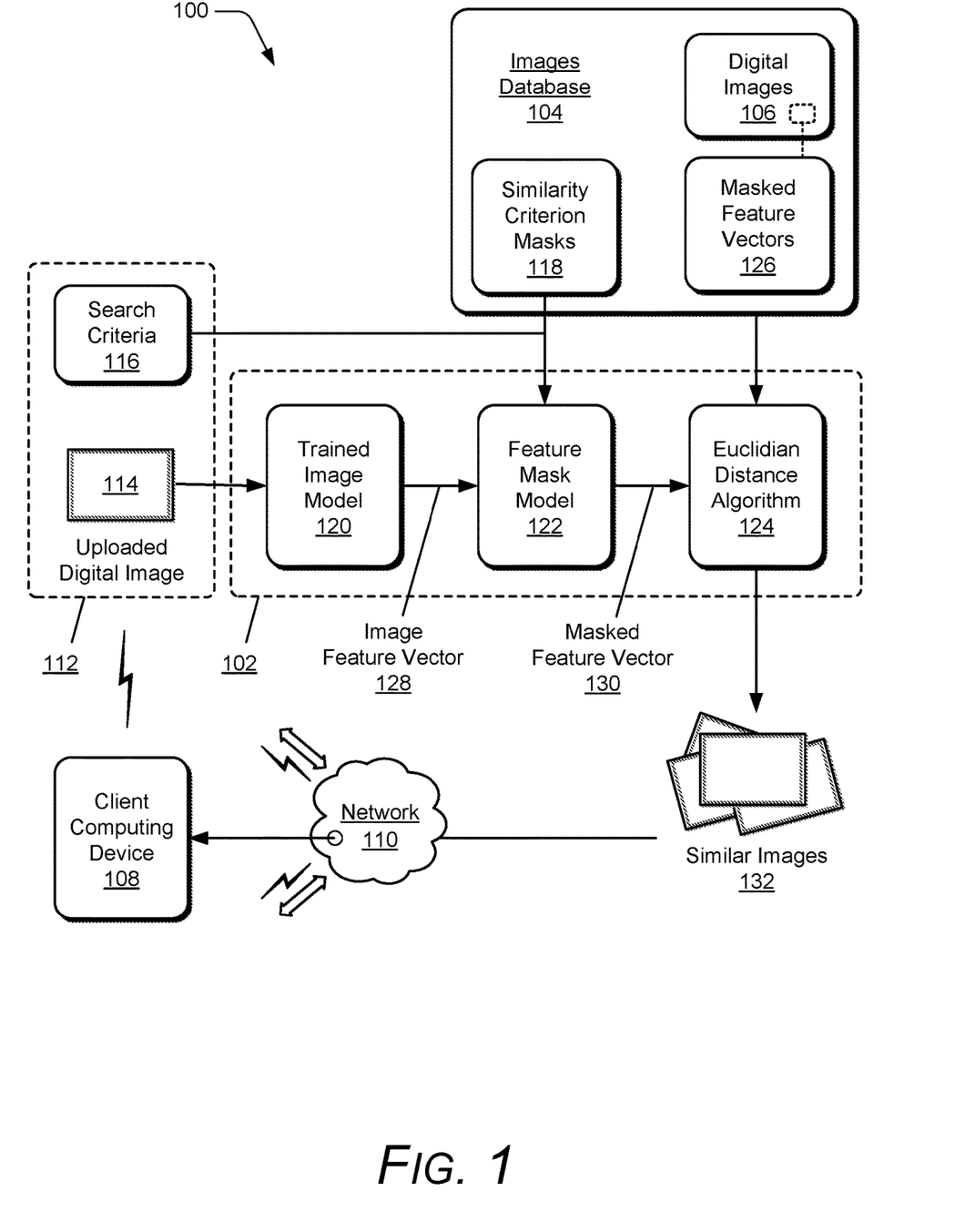
FIG. 1 illustrates an example system in which aspects of image search based on arbitrary image features can be implemented.

FIG. 1 illustrates an example system 100 in which aspects of image search based on arbitrary image features can be implemented. The example system 100 includes an image search system 102, which may be implemented as a cloud-based service system as shown and described with reference to FIG. 6. A cloud-based service system is representative of any number of cloud-based access sites that provide a service and/or from which data and information is available, such as via the Internet, for on-line and/or network-based access. Generally, the cloud-based service system described herein is an image service that can be accessed on-line, and includes an images database 104 of digital images 106. In other implementations, the cloud-based service system may be an overall asset service that can be accessed on-line, and includes one or more databases of digital images, graphics, videos, templates, and/or any other type of asset, such as may be made available on a subscription basis for user access.

The example system 100 also includes a client computing device 108 that is implemented to access and communicate with a server computing device of the image search system 102, such as via a communication network 110. For example, a user of the client computing device 108 can initiate a search of the digital images 106 in the images database 104, such as to find similar images to an image of interest to the user. The image search system 102 can receive a search input 112 as a digital image depicting image features, referred to as the uploaded digital image 114, received from the client computing device 108. The image search system 102 can also receive search criteria 116 as part of the search input 112 that is uploaded from the client computing device 108, and the search criteria correlates with one or more depicted image features in the uploaded digital image.

The search criteria 116 designated by the user of the client computing device 108 can be associated with similarity criterion masks 118 that each correspond to one or more image features of the digital images 106 in the images database 104. The user of the client computing device 108 can input the search criteria 116 that is then uploaded and used by the image search system 102 to determine similar images to the uploaded digital image 114 based on the similarity criterion masks. The similarity criterion masks 118 are determined by the image search system 102 while the image search system learns the image features of the digital images 106 in the images database 104 as further shown and described with reference to FIG. 4. The similarity criterion masks 118 may be representative of any type of depicted image feature, to include an item, object, person, color, background, theme, texture, lighting, and/or any other type of depicted image feature or characteristic shown in an uploaded digital image.

The features of the described image search based on arbitrary image features provide that the user of the client computing device 108 can not only upload the digital image 114 as a basis to determine or find other similar images stored in the images database 104, but the user can also define the context of image similarity for the image search, based on any selected arbitrary image features of the uploaded digital image 114. The user of the client computing device 108 can define the notion of similarity as per the particular use case related to the uploaded digital image 114. As noted above, the many different similarity criterion masks 118 are learned by the image search system 102 from image features depicted in the digital images 106, as the digital images are learned by the image search system 102.

Each of the digital images 106 in the images database 104 also has one or more associated similarity criterion masks 118 as determined by the image search system 102 for the features depicted in the digital images. The similarity criterion masks 118 can each be represented as a similarity feature vector of a digital image 106 in the images database 104, which indicates the features depicted in a particular digital image. The features of training the image search system 102, and the image search system learning the similarity criterion masks 118, as well as implementation features of the image search system 102 are further shown and described with reference to FIG. 4.

In this example system 100, the image search system 102 includes a trained image model 120, a feature mask model 122, and a Euclidian distance algorithm 124. In implementations, the trained image model 120 (also referred to as a pre-trained image model) is a convolutional neural network (e.g., a convNet system architecture) or other type of machine-learning model that is pre-trained for image classification, and can learn the image features of the digital images 106 in the images database 104. Generally, a convolutional neural network is a type of machine-learning model implemented as a computing algorithm for self-learning with multiple layers that run logistic regression on data to learn features and train parameters of the network. The self-learning aspect is also referred to as unsupervised feature learning because the input is unknown to the convolutional neural network, in that the network is not explicitly trained to recognize or classify the image features, but rather trains and learns the image features from the input, such as the digital images 106 in the images database 104 in the current example system 100. Alternatively, as noted above, the trained image model 120 may be a pre-trained convolutional neural network implemented in the image search system 102.

The feature mask model 122 can be implemented as a gradient descent type of model to determine the similarity criterion masks 118, as well as masked feature vectors 126 which are masked feature representations, for each of the digital images 106 in the images database 104. Generally, a gradient descent model can be implemented as an optimization algorithm designed to find the minimum of a function, and in this example system 100, optimizes for a loss function algorithm of the image search system. In this instance, the gradient descent algorithm of the feature mask model 122 minimizes a function to determine the masked feature vectors 126 that indicate image features of the digital images 106. The masked feature vector 126 and the similarity criterion masks 118 for a digital image 106 are determined by the feature mask model 122 conditioned on similarity criterion initially used by the feature mask model. Implementation of the feature mask model 122 in the image search system 102 is also further shown and described with reference to the learning aspect of the image search system in accordance with FIG. 4.

In implementations, each search criteria 116 is represented by a similarity criterion mask 118 in the image search system 102, and a combination of the similarity criterion masks can be used to represent similarity criterion corresponding to two or more of the search criteria for the depicted image features in the uploaded digital image 114. Multiple similarity criterion masks 118 that each correspond to a different search criteria 116 can be composed together for determining the similar images based on a combination of the similarity criterion. Generally, the similarity criterion represented by the similarity criterion masks 118 are composable during an image search for the similar images 132 to the uploaded digital image 114. For example, the user of the client computing device 108 may upload the digital image 114 that depicts image features of a sunset sky over an ocean view along a beach with a fire and people on the beach. The user can initiate the search for similar images with the search criteria 116 for the "sunset sky+blue ocean". The image search system 102 can then compose similarity criterion for the two search criteria by combining the pre-defined similarity criterion mask 118 for the image feature of "sunset sky" with the pre-defined similarity criterion mask 118 for the image feature of "blue ocean."

Continuing the example discussion, the user of the client computing device 108 can upload the digital image 114 as a basis to determine or find other similar images stored in the images database 104, and the user can define the context of image similarity for the image search with the search criteria 116 of the search input 112. The uploaded digital image 114 is an input to the trained image model 120 of the image search system 102, and the trained image model 120 is applied to determine an image feature vector 128 as an image feature representation of the received digital image, as uploaded by the user. The image feature vector 126 is a vector representation of the depicted image features in the uploaded digital image 114 that is received from the user. The feature mask model 122 of the image search system 102 is then applied to the image feature vector 128 to determine a masked feature vector 130 as a masked feature representation of the uploaded digital image 114 in context of the similarity criterion masks 118 that correlate to the search criteria 116, as uploaded by the user. The masked feature vector 130 is generated from the image feature vector 128 and is a vector representation of the image features in the uploaded digital image.

The Euclidian distance algorithm 124 of the image search system 102 can then determine a Euclidian distance between the uploaded digital image 114 and each of the database digital images 106. The Euclidian distances are determined based on a comparison of the masked feature vector 130 for the uploaded digital image to a masked feature vector 126 of each respective digital image 106 in the images database 104. The Euclidian distances identify the similar images 132 to the uploaded digital image 114 based on the similarity criterion. For example, the digital images 106 in the images database 104 that are determined to have the closest Euclidian distance to the uploaded digital image 114 are the similar images 132 having the similar image features, as requested by the user with the input search criteria 116 for the depicted image features in the uploaded digital image 114. Generally, the image search system 102 can compare the masked feature representation (e.g., the masked feature vector 130)

of the uploaded digital image 114 to a masked feature representation (e.g., masked feature vector 126) of each respective database digital image 106 to identify the similar images 132 to the received digital image based on the similarity criterion.

The determined similar images 132 can then be communicated, or returned from the image search system 102, to the client computing device 108 for the user. The determined similar images 132 are returned as the database digital images having the closest Euclidian distances between the masked feature vector 130 for the uploaded digital image 114 and the masked feature vectors 126 of each respective digital image 106 in the images database 104. The image search system 102 can also identify or indicate an image feature, or features, depicted in a returned similar image 132 as user feedback of the image features that contribute to determining a similar image is similar to the received digital image. For example, a returned similar image 132 may include a highlighted or otherwise identified section of the similar image that contributed to the determination of the image being similar to the uploaded digital image 114 from the user.

Any of the devices, servers, and/or services described herein can communicate via the network 110, such as for data communication between the image search system 102 and the client computing device 108. The network 110 can be implemented to include a wired and/or a wireless network. The network can also be implemented using any type of network topology and/or communication protocol, and can be represented or otherwise implemented as a combination of two or more networks, to include IP-based networks and/or the Internet. The network 110 may also include mobile operator networks that are managed by a mobile network operator and/or other network operators, such as a communication service provider, mobile phone provider, and/or Internet service provider.

Example methods 200, 300, and 500 are described with reference to respective FIGS. 2, 3, and 5 in accordance with one or more aspects of digital image search based on arbitrary image features. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 2:
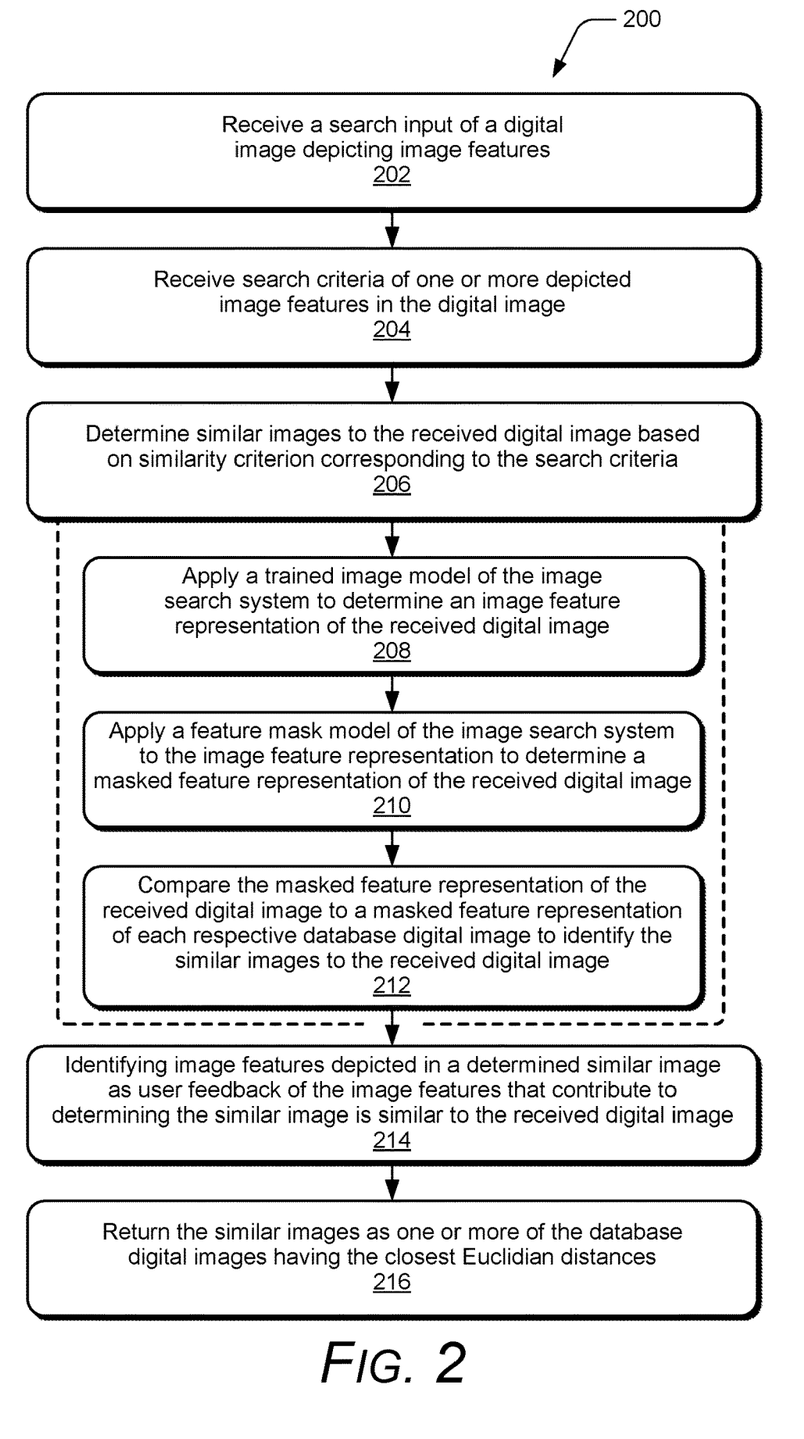
FIG. 2 illustrates an example method of image search based on arbitrary image features in accordance with one or more implementations.

FIG. 2 illustrates example method(s) 200 for digital image search based on arbitrary image features, and is generally described with reference to the image search system that is shown and described with reference to FIG. 1. The order in which the method is described is not intended to be construed as a limitation, and any number or combination of the method operations can be combined in any order to implement a method, or an alternate method.

At 202, a search input is received as a digital image depicting image features, and at 204, search criteria is received of one or more depicted image features in the digital image. For example, the image search system 102 receives the search input 112 as the uploaded digital image 114, and receives the search criteria 116 from the client computing device 108. A user of the client computing device 108 can upload the digital image 114 as a basis to determine or find other similar images stored in the images database 104, and the context of image similarity for the image search is defined with the search criteria 116 of the search input 112. The search criteria 116 is associated with similarity criterion masks 118 that each correspond to one or more image features of the digital images 106 in the images database 104. Each of the similarity criterion masks 118 represents a similarity criterion in the image search system 102, and a combination of the similarity criterion masks 118 can be used to represent similarity criterion corresponding to two or more of the search criteria 116 for the depicted image features in the uploaded digital image 114. Multiple similarity criterion masks 118 that each correspond to a different similarity criterion can be composed together for determining the similar images 132 based on a combination of the selected similarity criterion.

At 206, similar images to the received digital image are determined based on similarity criterion corresponding to the search criteria. For example, the image search system 102 determines the similar images 132 based on the similarity criterion corresponding to the search criteria 116 of the search input 112. As illustrated in FIG. 2, the similar images 132 to the uploaded digital image 114 (e.g., the received digital image by the image search system 102) are determined based on the following operations 208, 210, and 212 performed by components or modules of the image search system 102.

At 208, a trained image model of the image search system is applied to determine an image feature representation of the received digital image. For example, the trained image model 120 of the image search system 102 is applied to determine the image feature vector 128 as an image feature representation of the received digital image, as uploaded by the user. The image feature vector 128 represents the depicted image features in the received digital image. In implementations, the trained image model 120 is a convolutional neural network that is pre-trained for image classification, and can receive the uploaded digital image 114 as an input and learn the image features of the uploaded digital image.

At 210, a feature mask model of the image search system is applied to the image feature representation to determine a masked feature representation of the received digital image. For example, the feature mask model 122 of the image search system 102 is then applied to the image feature vector 128 to determine the masked feature vector 130 as a masked feature representation of the uploaded digital image 114 in context of the similarity criterion masks 118 that correlate to the search criteria 116, as uploaded by the user. The masked feature vector 130 is generated from the image feature vector 128 and is a vector representation of the depicted image features in the uploaded digital image 114 conditioned on the similarity criterion of the image features.

At 212, the masked feature representation of the received digital image is compared to a masked feature representation of each respective database digital image to identify the similar images to the received digital image. For example, the Euclidian distance algorithm 124 of the image search system 102 determines a Euclidian distance between the uploaded digital image 114 and each of the database images 106. The Euclidian distances are determined based on a comparison of the masked feature vector 130 for the uploaded digital image 114 to a masked feature vector 126 of each respective digital image 106 in the images database 104. The determined Euclidian distances identify the similar images 132 to the uploaded digital image 114 based on the similarity criterion.

At 214, image features depicted in a determined similar image are identified as user feedback of the image features that contribute to determining the similar image is similar to the received digital image. For example, the image search system 102 identifies or indicates an image feature, or features, depicted in a returned similar image 132 as user feedback of the image features that contribute to determining a similar image 132 is similar to the received digital image. For example, a returned similar image 132 may include a highlighted or otherwise identified section of the similar image that contributed to the determination of the image being similar to the uploaded digital image 114 from the user.

At 216, the similar images are returned as one or more of the database digital images having the closest Euclidian distances. For example, the cloud-based service system that implements the image search system 102 communicates or otherwise returns the determined similar images 132 to the client computing device 108 for the user. The determined similar images 132 are returned as the database digital images having the closest Euclidian distances between the masked feature vector 130 for the uploaded digital image 114 and the masked feature vectors 126 of each respective digital image 106 in the images database 104.

Figure 3:
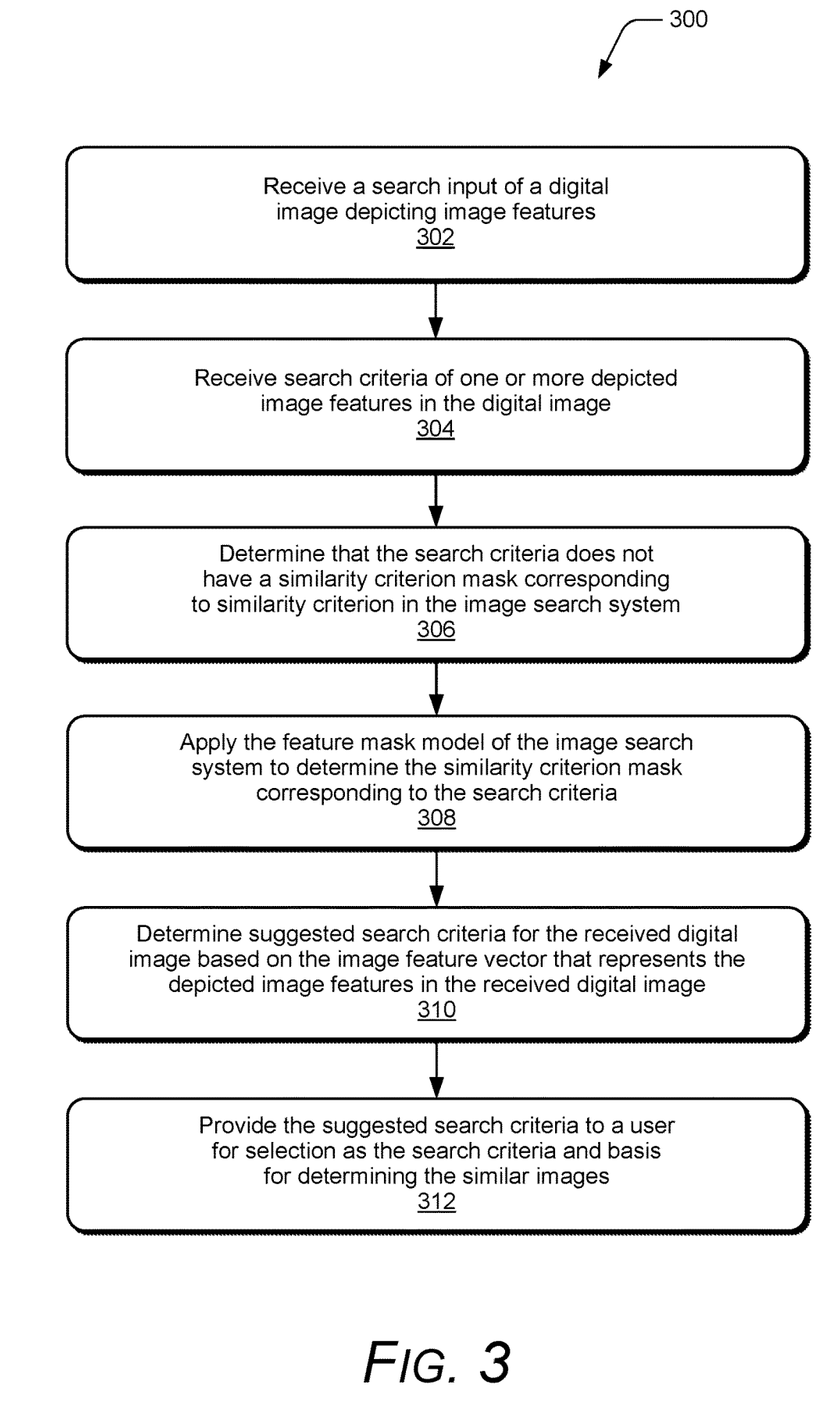
FIG. 3 illustrates an example method of image search based on arbitrary image features in accordance with one or more implementations.

FIG. 3 illustrates example method(s) 300 for digital image search based on arbitrary image features, and is generally described with reference to the image search system as shown and described with reference to FIG. 1. The order in which the method is described is not intended to be construed as a limitation, and any number or combination of the method operations can be combined in any order to implement a method, or an alternate method.

At 302, a search input is received as a digital image depicting image features, and at 304, search criteria is received of one or more depicted image features in the digital image. For example, the image search system 102 receives the search input 112 as the uploaded digital image 114, and receives the search criteria 116 from the client computing device 108. A user of the client computing device 108 can upload the digital image 114 as a basis to determine or find other similar images stored in the images database 104, and the context of image similarity for the image search is defined with the search criteria 116 of the search input 112.

At 306, a determination is made that the search criteria does not have a similarity criterion mask corresponding to the similarity criterion in the image search system. For example, the image search system 102 determines that the search criteria 116 uploaded as part of the search input 112 from the user via the client computing device 108 does not have a similarity criterion mask 118 corresponding to the similarity criterion in the image search system. Each of the digital images 106 in the images database 104 has one or more associated similarity criterion masks 118 as determined by the image search system 102 for the features depicted in the digital images. The similarity criterion masks 118 can each be represented as a similarity feature vector of a digital image 106 in the images database 104, which indicates the features depicted in a particular digital image. However, a user may input search criteria 116 as similarity criterion that was not determined from the digital images 106 in the images database 104, and thus, a corresponding similarity criterion mask 118 for the similarity criterion has not yet been generated.

At 308, the feature mask model of the image search system is applied to determine the similarity criterion mask corresponding to the search criteria. For example, the feature mask model 122 of the image search system 102 is then applied to the image feature vector 128 of the uploaded digital image 114 to determine the similarity criterion mask 118 for the image feature in context of the similarity criterion that correlates to the search criteria 116, as uploaded by the user.

At 310, suggested search criteria is determined for the received digital image based on the image feature vector that represents the depicted image features in the received digital image, and at 312, the suggested search criteria is provided to a user for selection as the search criteria and basis for determining the similar images. For example, the image search system 102 determines suggested search criteria for the uploaded digital image 114 from a user of the client computing device 108 in an event that the user does not indicate the search criteria 116 as part of the search input 112. The image search system 102 determines the suggested search criteria based on the image feature vector 128 that represents the depicted image features in the received digital image. The cloud-based service system that implements the image search system 102 communicates or otherwise provides the suggested search criteria to the user of the client computing device 108 for selection as the search criteria 116 and basis for determining the similar images 132.

Figure 4:
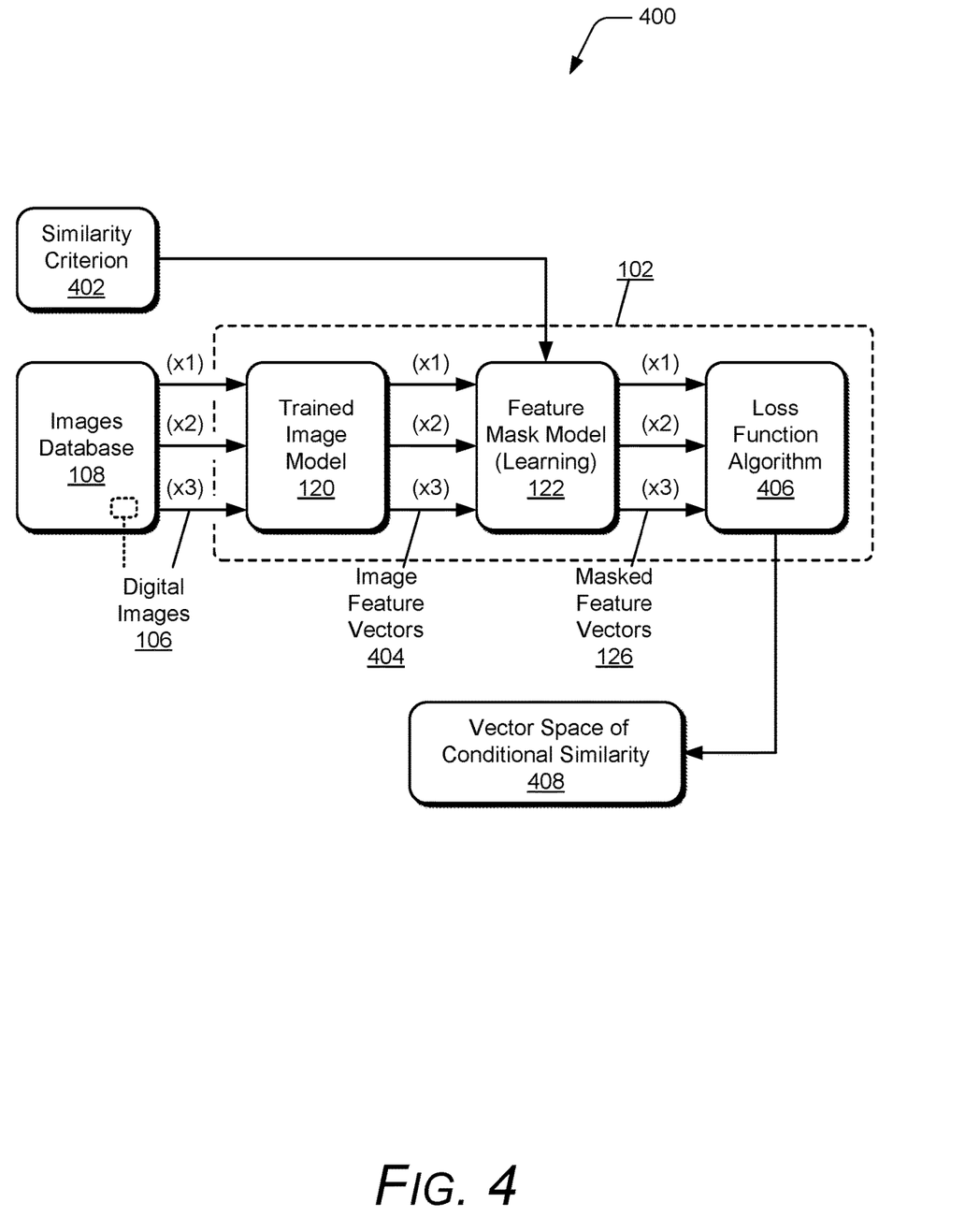
FIG. 4 further illustrates features of the example system in accordance with one or more aspects of image search based on arbitrary image features.

FIG. 4 illustrates an example implementation 400 of features of the image search system 102 in which aspects of image search based on arbitrary image features can be implemented. The example implementation 400 includes the image search system 102, which may be implemented as the cloud-based service system as shown and described with reference to FIG. 6. Generally, the cloud-based service system described herein is an image service that can be accessed on-line, and includes the images database 104 of the digital images 106, which may be millions of high-quality digital images, graphics, videos, and other image assets. In other implementations, the cloud-based service system may be an overall asset service that can be accessed on-line, and includes one or more databases of digital images, graphics, videos, templates, and/or any other type of asset, such as may be made available on a subscription basis for user access.

In this example implementation 400, the image search system 102 learns a basis for comparison of the digital images 106 in the images database 104 based on similarity criterion 402. Generally, the image search system 102 is designed to differentiate different notions of similarity into image features which are encoded into separate dimensions. More specifically, the image search system 102 learns feature masks as the masked feature vectors 126 that are applied over image feature vectors 404 that represent the digital images 106 as generated by the trained image model 120 (e.g., a pre-trained image classification model) to induce subspaces which can capture different notions of similarity.

In this example implementation 400, the image search system 102 includes the trained image model 120, the feature mask model 122 (e.g., in a learning mode), and a loss function algorithm 406. In implementations, the trained image model 120 (also referred to as a pre-trained image model) is a convolutional neural network (e.g., a convNet system architecture) or other type of machine-learning model that is pre-trained for image classification, and can learn the image features of the digital images 106 in the images database 104. Generally, a convolutional neural network is a type of machine-learning model implemented as a computing algorithm for self-learning with multiple layers that run logistic regression on data to learn features and train parameters of the network. The self-learning aspect is also referred to as unsupervised feature learning because the input is unknown to the convolutional neural network, in that the network is not explicitly trained to recognize or classify the image features, but rather trains and learns the image features from the input. In the current example implementation 400, the trained image model 120 is a pre-trained convolutional neural network implemented in the image search system 102, and classifies image features of the digital images 106 in the images database 104. Alternatively, the trained image model 120 may be any type of machine-learning model, including but not limited to, decision trees, support vector machines, linear regression, logistic regression, Bayesian networks, random forest learning, dimensionality reduction algorithms, boosting algorithms, neural networks (e.g., fully-connected neural networks, convolutional neural networks, or recurrent neural networks), deep learning networks, etc.

The digital images 106 are each input from the images database 104 to the trained image model 120, such as the three example digital images identified as x1, x2, and x3. For the learning aspect of the image search system 102, the similarity criterion 402 is a known condition, meaning that the similarity criterion in the learning mode is a known, designated input to the image search system 102, such as a yes/no type of indication that two compared images are similar, or the two compared images are not similar. The digital images x1, x2, and x3 are input to the trained image model 120, along with a condition of the similarity criterion, where images x1 and x2 are designated as being similar and images x1 and x3 are designated as not similar per the similarity criterion condition. Each possible combination pair of the digital images 106 in the images database 104 are input through the trained image model 120, which generates output of an image feature vector 404 for each one of the digital images x1, x2, and x3.

The image feature vector 404 for a digital image 106 is a vector representation of the depicted image features in the digital image. For example, the image feature vectors 404 for the corresponding digital images may be represented by the following vectors: image x1 vector is $\{1,2,3\}$, image x2 vector is $\{1,4,7\}$, and image x3 vector is $\{3,2,3\}$ considering a simple example of the images having three distinguishable image features. As noted above, the digital images x1, x2, and x3 are input to the trained image model 120, along with known conditions of the similarity criterion that the images x1 and x2 are not similar and the images x1 and x3 are similar.

The masked feature vectors 126 for the digital images x1, x2, and x3 are each a feature mask over top of the respective image feature vectors 404 that indicate the similarities or non-similarities between the digital images. For example, the masked feature vector for the images x1, x2 is $\{1,0,0\}$, which is multiplied times the image feature vectors for the images (image x1 vector is $\{1,2,3\}$, image x2 vector is $\{1,4,7\}$), and the masked feature vector for image x3 would be $\{3,0,0\}$, indicating that image x3 is not similar to either of the images x1 or x2 having the masked feature vector of $\{1,0,0\}$. In another example where the similarity criterion 402 is input to indicate that the images x1 and x3 are similar, but the images x1 and x2 are not similar, then a masked feature vector of $\{0,1,1\}$ would result in a masked feature vector 126 for the image x1 of $\{0,2,3\}$, and similarly for the image x2 of $\{0,2,3\}$, indicating that the images are similar.

As noted previously, the feature mask model 122 is implemented as a gradient descent type of model to determine the masked feature vectors 126 for each of the digital images 106 in the images database 104. Generally, a gradient descent model can be implemented as an optimization algorithm designed to find the minimum of a function, and in this example implementation 400, optimizes for the loss function algorithm 406 of the image search system. In this instance, the gradient descent algorithm of the feature mask model 122 minimizes a function to determine the masked feature vectors 126 that indicate image features of the digital images 106. As implemented, the feature mask model 122 considers each possible combination pair of the digital images 106 by two images at a time.

For example, the feature mask model 122 is applied to first run the images x1, x2 based on the similarity criterion 402 input for those two images, and will determine that they are similar and generate the masked feature vector 126. The feature mask model 122 is then applied to run the images x1, x3 based on the similarity criterion 402 input for these two particular images, and will determine that they are not similar and update the generated masked feature vector 126. The feature mask model 122 is then applied to run the images x2, x3 based on the similarity criterion 402 input for these two particular images, and will determine that they are not similar and again update the generated masked feature vector 126.

The masked feature vectors 126 for the input digital images x1, x2, and x3 are determined by the feature mask model 122 conditioned on the similarity criterion 402 initially used by the feature mask model. The loss function algorithm 406 is then applied to maximize the Euclidean distance between the images x1 and x3 (which are not similar as designated by the similarity criterion 402) while minimizing the distance between images x1 and x2 (which are similar as designated by the similarity criterion 402). As described with reference to FIG. 1, the similar images 132 to an uploaded digital image 114 can be determined given the digital image 114 per the notion of similarity as indicated by the search criteria 116, conditioned on the similarity criterion.

For example, the user of the client computing device 108 can upload the digital image 114 as a basis to determine or find other similar images stored in the images database 104, and the context of image similarity for the image search is defined with the search criteria 116 of the search input 112. The feature mask model 122 can receive an image feature vector of $\{3,10,13\}$ for the uploaded digital image 114, and look up the feature mask, such as $\{1,0,0\}$, for the similarity criterion input. A masked feature vector of $\{3,0,0\}$ results and the $\{3,0,0\}$ masked feature vector can be utilized to determine the Euclidian distances between the uploaded digital image 114 and every other digital image 106 in the images database 104 by comparing the $\{3,0,0\}$ masked feature vector to all the masked feature vectors 126 for the digital images 106 in the images database 104. The vector space of conditional similarity 408 (also referred to as the disentangled vector space) is the result of multiplying the image feature vectors 404 with the masked feature vectors (e.g., feature mask, such as $\{1,0,0\}$ or $\{3,0,0\}$), and this vector space of conditional similarity 408 indicates the similar images 132 that are communicated to the client computing device 108 as the image search system output for the user.

Figure 5:
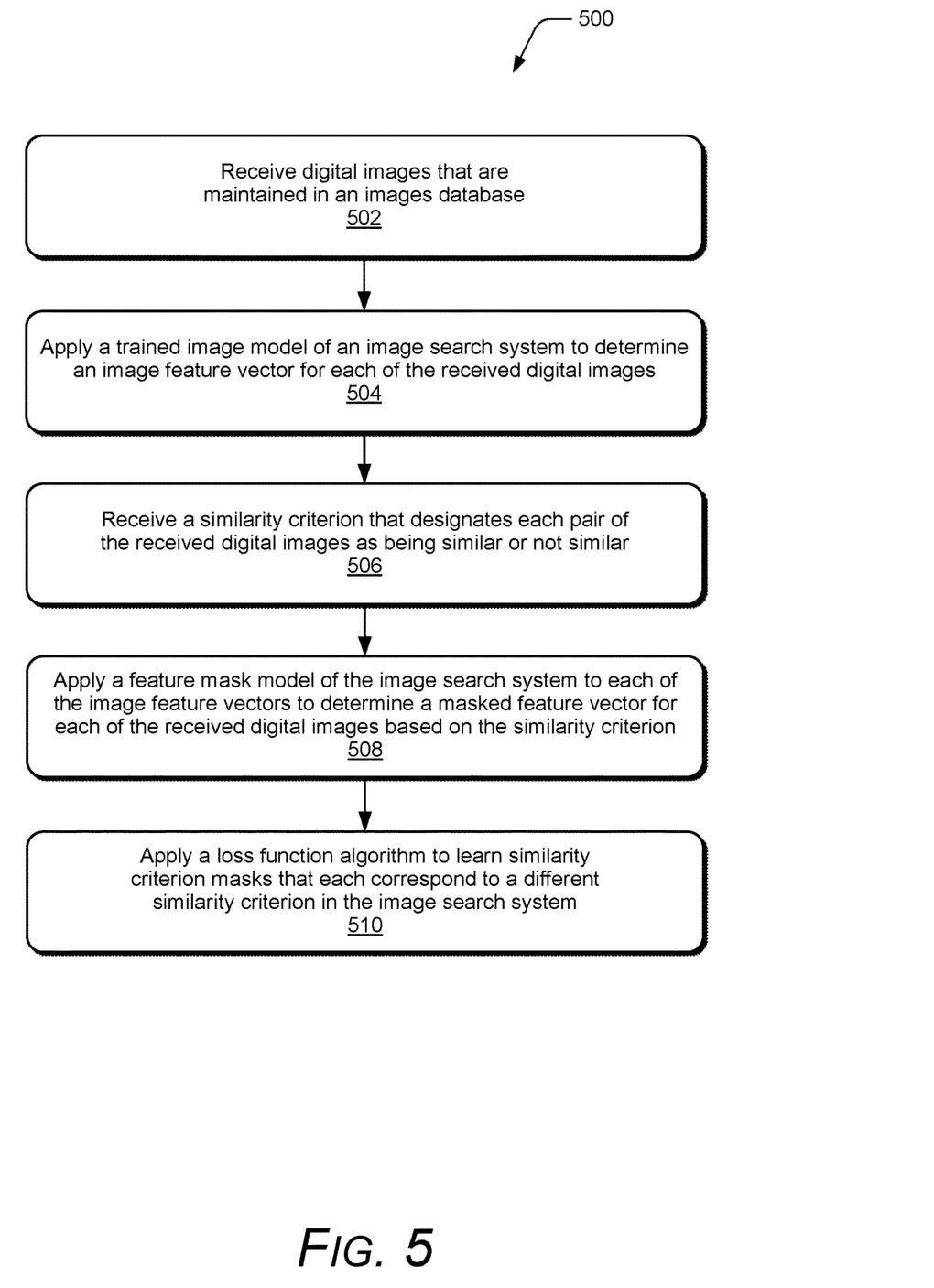
FIG. 5 illustrates an example method of image search based on arbitrary image features in accordance with one or more implementations.

FIG. 5 illustrates example method(s) 500 for digital image search based on arbitrary image features, and is generally described with reference to the image search system as shown and described with reference to FIG. 4. The order in which the method is described is not intended to be construed as a limitation, and any number or combination of the method operations can be combined in any order to implement a method, or an alternate method.

At 502, digital images that are maintained in an images database are received. For example, the trained image model 120 of the image search system 102 receives as input the digital images 106 stored in the images database 104. Each possible combination pair of the digital images 106 in the images database 104 are input through the trained image model 120.

At 504, a trained image model of an image search system is applied to determine an image feature vector for each of the received digital images. For example, the trained image model 120 of the image search system 102 generates output of an image feature vector 404 for each one of the digital images 106. The image feature vector 404 for a digital image 106 is a vector representation of the depicted image features in a digital image.

At 506, a similarity criterion is received that designates each pair of the received digital images as being similar or not similar. For example, the image search system 102 receives the similarity criterion 402 that designates each pair of the received digital images 106 as being similar or not similar. For the learning aspect of the image search system 102, the similarity criterion 402 is a known condition, meaning that the similarity criterion in the learning mode is a known, designated input to the image search system 102, such as a yes/no type of indication that two compared images are similar, or the two compared images are not similar.

At 508, a feature mask model of the image search system is applied to each of the image feature vectors to determine a masked feature vector for each of the received digital images based on the similarity criterion. For example, the feature mask model 122 of the image search system 102 is applied to determine the masked feature vectors 126 for each of the digital images 106 in the images database 104. The feature mask model 122 considers each possible combination pair of the digital images 106 by two images at a time. The masked feature vectors 126 represent the similarity criterion of the depicted image features in the digital images.

At 510, a loss function algorithm is applied to learn similarity criterion masks that each correspond to a different similarity criterion in the image search system. For example, the loss function algorithm 406 of the image search system 102 is applied to learn the similarity criterion masks 118 that each correspond to a different similarity criterion of the image features in the image search system.

Figure 6:
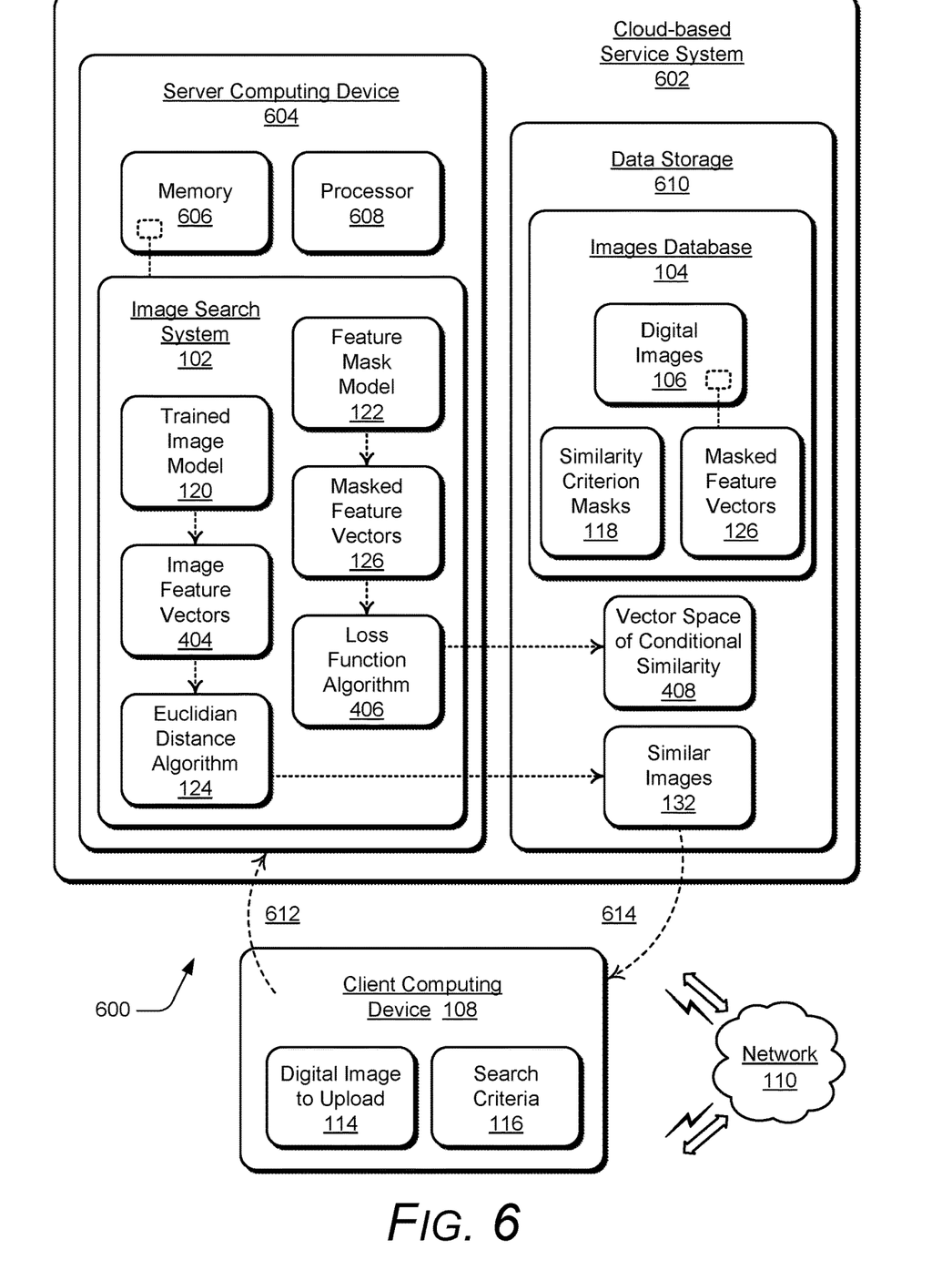
FIG. 6 further illustrates features of the example system in accordance with one or more aspects of image search based on arbitrary image features.

FIG. 6 illustrates an example system 600 that includes features of the image search system 102 implemented in a cloud-based service system 602, in which techniques of image search based on arbitrary image features can be implemented, such as shown and described with reference to FIGS. 1-5. The example system 600 includes the cloud-based service system 602, which is an image service that can be accessed on-line, and includes the images database 104 of the digital images 106, such as may be millions of high-quality digital images, graphics, videos, and other image assets. In other implementations, the cloud-based service system 602 may be an overall asset service that can be accessed on-line, and includes one or more databases of digital images, graphics, videos, templates, and/or any other type of asset, such as may be made available on a subscription basis for user access.

The example system 600 includes the cloud-based service system 602, the client computing device 108, and the network 110 via which any of the devices, servers, and/or services described herein can communicate. The cloud-based service system 602 includes a server computing device 604, which is representative of one or more hardware server devices (e.g., computing devices) that may be implemented at the cloud-based service system. The server computing device 604 includes memory 606 and a processor 608, and may include any number and combination of different components as further described with reference to the example device shown in FIG. 7.

In this example system 600, the server computing device 604 implements the image search system 102, such as in software, in hardware, or as a combination of software and hardware components. In this example, the image search system 102 is implemented as a software application or module, such as executable software instructions (e.g., computer-executable instructions) that are executable with a processing system (e.g., the processor 608) of the server computing device 604 to implement the techniques of image search based on arbitrary image features. The image search system 102 can be stored on computer-readable storage media, such as any suitable memory device (e.g., the device memory 606) or electronic data storage implemented in the server computing device 604 and/or at the cloud-based service system 602. The cloud-based service system 602 may include multiple data storage, server devices, and applications, and can be implemented with various components as further described with reference to the example device shown in FIG. 7.

The cloud-based service system 602 also includes data storage 610 that may be implemented as any suitable memory, memory device, or electronic data storage for network-based data storage. The data storage 610 is utilized at the cloud-based service system 602 to maintain the images database 104 of the digital images 106, as well as the similarity criterion masks 118 and the masked feature vectors 126, as described with reference to the example system and implementations of the image search system 102 shown and described in FIGS. 1 and 4. The data storage 610 is also utilized at the cloud-based service system 602 to maintain the data for the vector space of conditional similarity 408, as generated by the image search system 102 in the learning mode of the system, as well as maintain the similar images 132 that are determined by the image search system 102 when requested by a user of the client computing device 108.

As shown in this example system 600, the server computing device 604 implements the image search system 102, which includes the trained image model 120 as a convolutional neural network, and the feature mask model 122 as a gradient descent model implemented as an optimization algorithm. As described with reference to FIGS. 1-3, the trained image model 120 of the image search system 102 receives at 612 the uploaded digital image 114 and the search criteria 116 as the basis to determine or find other similar images stored in the images database 104. The uploaded digital image 114 is an input to the trained image model 120, which is applied to determine the image feature vector of the received digital image, as uploaded by the user.

The feature mask model 122 of the image search system 102 is then applied to the image feature vector to determine the masked feature vector for the uploaded digital image 114 in context of the similarity criterion masks 118 that correlate to the search criteria 116. The Euclidian distance algorithm 124 of the image search system 102 can then determine a Euclidian distance between the uploaded digital image 114 and each of the database digital images 106 based on a comparison of the masked feature vector for the uploaded digital image to a masked feature vector of each respective digital image 106 in the images database 104. The Euclidian distances identify the similar images 132 to the uploaded digital image 114 based on the similarity criterion, and the similar images 132 can then be communicated at 614 to the client computing device 108 for the user.

Similarly, in the learning mode of the image search system 102 as described with reference to FIGS. 4 and 5, the trained image model 120 of the image search system 102 learns a basis for comparison of the digital images 106 in the images database 104 based on similarity criterion 402. The trained image model 120 receives input of each possible combination pair of the digital images 106 in the images database 104 to learn the image features of the digital images, and generates the image feature vectors 404 for each of the respective digital images. The feature mask model 122 receives as input the image feature vectors 404 for each of the respective digital images, and can then determine the masked feature vectors 126 for each of the digital images 106 in the images database 104. The masked feature vectors 126 for the input digital images 106 are determined by the feature mask model 122 conditioned on the similarity criterion 402 initially used by the feature mask model. The loss function algorithm 406 is then applied to maximize the Euclidean distance between the images, generating the vector space of conditional similarity 408, which indicates the similar images 132.

Figure 7:
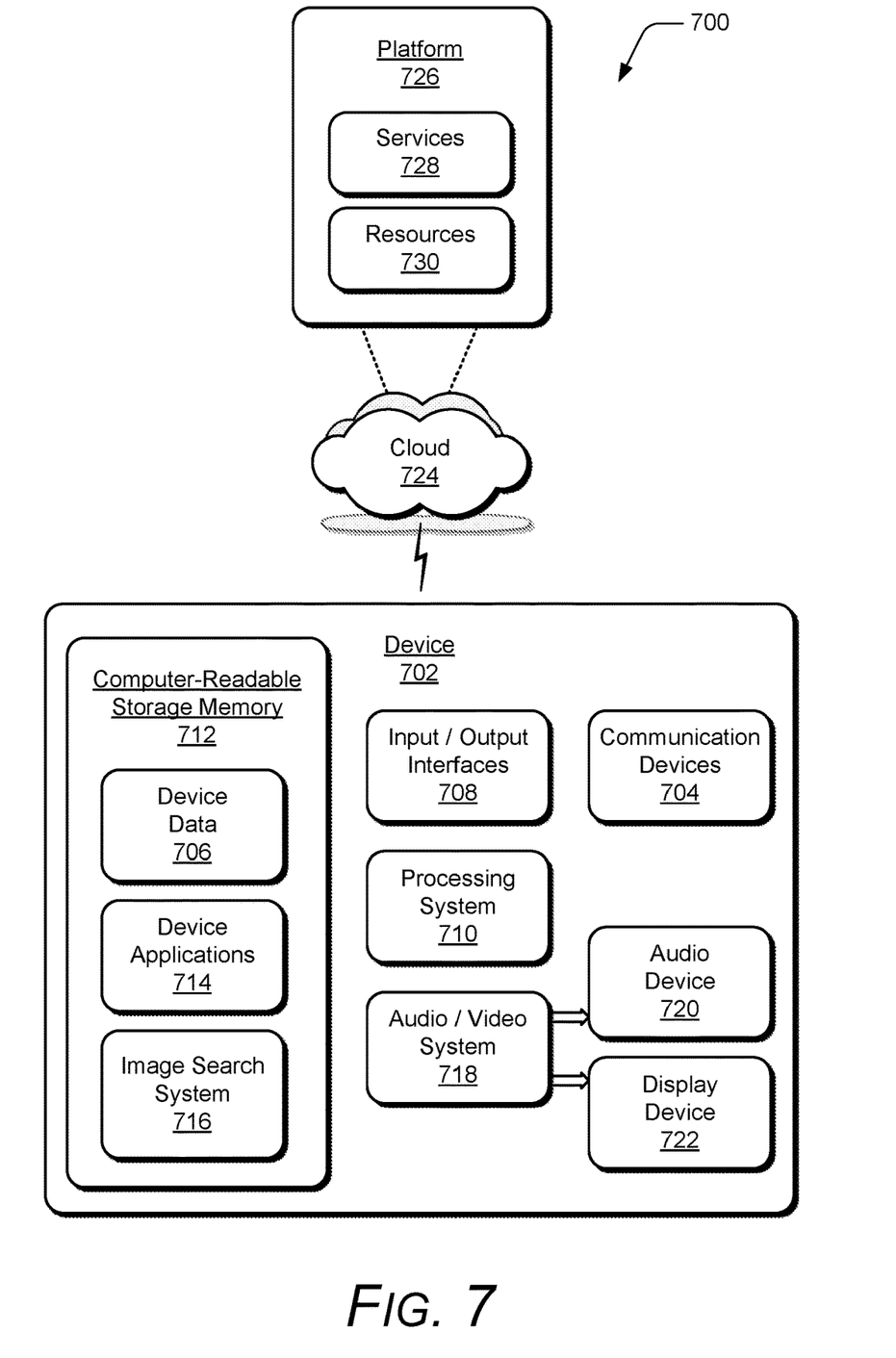
FIG. 7 illustrates an example system with an example device that can implement aspects of image search based on arbitrary image features.

FIG. 7 illustrates an example system 700 that includes an example device 702, which can implement techniques of image search based on arbitrary image features. The example device 702 can be implemented as any of the computing devices, mobile devices, server devices, and/or services described with reference to the previous FIGS. 1-6, such as any type of computing device, client device, mobile phone, tablet, communication, entertainment, gaming, media playback, and/or other type of device. For example, the client computing device 108, the server computing device 604, and/or various server devices of the cloud-based service system 602 may be implemented as the example device 702.

The example device 702 includes communication devices 704 that enable wired and/or wireless communication of device data 706, such as the digital images and search criteria data that is communicated between the devices in a network, as well as computer applications data and content that is transferred from one computing device to another, and/or synched between multiple computing devices. The device data 706 can include any type of audio, video, image, and/or graphic data that is generated by applications executing on the device. The communication devices 704 can also include transceivers for cellular phone communication and/or for network data communication.

The device 702 also includes input/output (I/O) interfaces 708, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 702. The I/O interfaces also include data input ports via which any type of data, media content, and/or inputs can be received, such as user inputs to the device, as well as any type of audio, video, and/or image data received from any content and/or data source.

The device 702 includes a processing system 710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The example device 702 also includes computer-readable storage memory 712, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 712 can include various implementations of random access memory (RAM), read-only memory (ROM), flash memory, and other types of storage memory in various memory device configurations.

The computer-readable storage memory 712 provides storage of the device data 706 and various device applications 714, such as an operating system that is maintained as a software application with the computer-readable storage memory and executed by the processing system 710. In this example, the device applications also include various computer applications and an image search system 716 that implements the described techniques of image search based on arbitrary image features, such as when the example device 702 is implemented as the server computing device 604 shown in FIG. 6. An example of the image search system 716 includes the image search system 102 that is implemented by the server computing device 604, and/or various server devices of the cloud-based service system 603, as described with reference to FIGS. 1-6.

The device 702 also includes an audio and/or video system 718 that generates audio data for an audio device 720 and/or generates display data for a display device 722. The audio device and/or the display device include any devices that process, display, and/or otherwise render audio, video, display, and/or image data. In implementations, the audio device and/or the display device are integrated components of the example device 702. Alternatively, the audio device and/or the display device are external, peripheral components to the example device. In embodiments, at least part of the techniques described for image search based on arbitrary image features may be implemented in a distributed system, such as over a "cloud" 724 in a platform 726. The cloud 724 includes and/or is representative of the platform 726 for services 728 and/or resources 730. For example, the services 728 may include the cloud-based service system 602 described with reference to FIGS. 1-6.

The platform 726 abstracts underlying functionality of hardware, such as server devices (e.g., included in the services 728) and/or software resources (e.g., included as the resources 730), and connects the example device 702 with other devices, servers, etc. The resources 730 may also include applications and/or data that can be utilized while computer processing is executed on servers that are remote from the example device 702. Additionally, the services 728 and/or the resources 730 may facilitate subscriber network services, such as over the Internet, a cellular network, or Wi-Fi network. The platform 726 may also serve to abstract and scale resources to service a demand for the resources 730 that are implemented via the platform, such as in an interconnected device embodiment with functionality distributed throughout the system 700. For example, the functionality may be implemented in part at the example device 702 as well as via the platform 726 that abstracts the functionality of the cloud 724.

Although implementations of image search based on arbitrary image features have been described in language specific to features and/or methods, the appended claims are not necessarily limited to the specific features or methods described. Rather, the specific features and methods are disclosed as example implementations of image search based on arbitrary image features, and other equivalent features and methods are intended to be within the scope of the appended claims. Further, various different examples are described and it is to be appreciated that each described example can be implemented independently or in connection with one or more other described examples.

The invention claimed is:

1. A method for searching stored digital images based on arbitrary image features, the method implemented by at least one computing device of an image search system, the method comprising:
   receiving a search input as a digital image depicting image features;
   receiving search criteria of one or more depicted image features in the digital image;
   determining similar images to the received digital image based on similarity criterion corresponding to the search criteria, the determining comprising:
      applying a trained image model to determine an image feature representation of the received digital image;
      applying a feature mask model to the image feature representation to determine a masked feature representation of the received digital image based on the image feature representation of the received digital image; and
      comparing the masked feature representation of the received digital image to a respective masked feature representation of each stored digital image to identify the similar images to the received digital image based on the similarity criterion.

2. The method as recited in claim 1, further comprising:
   returning the similar images as one or more of the stored digital images having similar representations of the masked feature representation for the received digital image and the masked feature representation of each respective stored digital image.

3. The method as recited in claim 2, further comprising:
   identifying one or more image features depicted in a returned similar image as user feedback of the image features contributing to the identifying the similar images to the received digital image.

4. The method as recited in claim 1, wherein:
   the applying the trained image model of the image search system includes to determine the image feature representation as an image feature vector of the received digital image, the image feature vector representing the depicted image features in the received digital image;
   the applying the feature mask model of the image search system to the image feature vector includes to determine the masked feature representation as a masked feature vector for the received digital image, the masked feature vector representing the similarity criterion of the depicted image features in the received digital image; and
   the comparing comprises determining a Euclidian distance between the received digital image and each of the stored digital images, the Euclidian distances determined based on a comparison of the masked feature vector for the received digital image to respective masked feature vectors of the stored digital images, and the Euclidian distances identifying the similar images to the received digital image based on the similarity criterion.

5. The method as recited in claim 4, further comprising:
   returning the similar images as one or more of the stored digital images having closest Euclidian distances between the masked feature vector for the received digital image and the respective masked feature vectors of the stored digital images.

6. The method as recited in claim 1, wherein:
   each of the similarity criterion is represented by a similarity criterion mask; and
   a combination of two or more similarity criterion masks represent the similarity criterion corresponding to two or more of the search criteria for the depicted image features in the received digital image.

7. The method as recited in claim 6, further comprising:
   composing together one or more similarity criterion masks that each correspond to the search criteria, the composed one or more similarity criterion masks usable for the determining the similar images based on a combination of the similarity criterion.

8. The method as recited in claim 1, further comprising:
   determining that the search criteria does not have a similarity criterion mask corresponding to the similarity criterion in the image search system; and
   determining the similarity criterion mask corresponding to the search criteria.

9. The method as recited in claim 1, further comprising:
   determining suggested search criteria for the received digital image based on the image feature representation that represents the depicted image features in the received digital image; and
   providing the suggested search criteria to a user for selection as the search criteria and basis for the determining the similar images.

10. A system for searching stored digital images based on arbitrary image features, the system comprising:
    means for determining similar images to a received digital image based on similarity criterion corresponding to search criteria, the means for determining comprising:
       applying a trained image model to determine an image feature representation of the received digital image;
       applying a feature mask model to the image feature representation to determine a masked feature representation of the received digital image based on the image feature representation of the received digital image, the masked feature representation identifying depicted image features in the received digital image; and means for comparing the masked feature representation of the received digital image to a respective masked feature representation of each stored digital image to identify the similar images to the received digital image based on the similarity criterion.

11. The system as recited in claim 10, further comprising:
means for returning the similar images as one or more of the stored digital images having similar representations of the masked feature representation for the received digital image and the masked feature representation of each respective stored digital image.

12. A server computing device implemented to search stored digital images based on arbitrary image features, the server computing device comprising:
a memory to maintain an images database of the stored digital images;
a processor system configured to execute an image search system implemented to perform operations comprising to:
receive a search input as a digital image depicting image features;
receive search criteria of one or more depicted image features in the digital image;
determine similar images to the received digital image based on similarity criterion corresponding to the search criteria, the operation to determine the similar images comprising to:
apply a trained image model of the image search system to determine an image feature representation of the received digital image;
apply a feature mask model of the image search system to the image feature representation to determine a masked feature representation of the received digital image; and
compare the masked feature representation of the received digital image to a respective masked feature representation of each stored digital image to identify the similar images to the received digital image based on the similarity criterion.

13. The server computing device as recited in claim 12, wherein:
the image feature representation is an image feature vector generated by the trained image model and represents the depicted image features in the received digital image; and
the masked feature representation is a masked feature vector generated by the feature mask model and represents the similarity criterion of the depicted image features in the digital image.

14. The server computing device as recited in claim 12, wherein:

the operation to determine the similar images comprise to determine a Euclidian distance between the received digital image and each of the stored digital images, the Euclidian distances identifying the similar images to the received digital image based on the similarity criterion; and the Euclidian distances are determined based on a comparison of the masked feature vector for the received digital image to a masked feature vector of each respective stored digital image.

15. The server computing device as recited in claim 14, wherein the image search system is implemented to return the similar images as one or more of the stored digital images having closest Euclidian distances between the masked feature vector for the received digital image and the masked feature of each respective stored digital image.

16. The server computing device as recited in claim 15, wherein the image search system is implemented to identify one or more image features depicted in a returned similar image as user feedback of the image features contributing to the determination of the similar image to the received digital image.

17. The server computing device as recited in claim 12, wherein:
each of the similarity criterion is represented by a similarity criterion mask; and
a combination of two or more similarity criterion masks represent the similarity criterion corresponding to two or more of the search criteria for the depicted image features in the received digital image.

18. The server computing device as recited in claim 12, wherein the image search system is implemented to compose together one or more similarity criterion masks that each correspond to the search criteria, the composed one or more similarity criterion masks usable to determine the similar images based on a combination of the similarity criterion.

19. The server computing device as recited in claim 12, wherein the image search system is implemented to:
determine that the search criteria does not have a similarity criterion mask corresponding to the similarity criterion in the image search system; and
apply the feature mask model of the image search system to determine the similarity criterion mask corresponding to the search criteria.

20. The server computing device as recited in claim 12, wherein the image search system is implemented to:
determine suggested search criteria for the received digital image based on the image feature representation that represents the depicted image features in the received digital image; and
provide the suggested search criteria to a user for selection as the search criteria and basis for the determination of the similar images.

* * * * *